United States Patent [19]

Yamada et al.

[11] Patent Number: 5,419,180
[45] Date of Patent: May 30, 1995

[54] KNOCKING DETECTING APPARATUS FOR INTERNAL COMBUSTION ENGINE

[75] Inventors: Junji Yamada; Toshio Iwata; Atsushi Ueda, all of Hyogo, Japan

[73] Assignee: Mitsubishi Denki Kabushiki Kaisha, Tokyo, Japan

[21] Appl. No.: 110,832

[22] Filed: Aug. 24, 1993

Related U.S. Application Data

[63] Continuation of Ser. No. 765,291, Sep. 25, 1991, abandoned.

[30] Foreign Application Priority Data

Sep. 27, 1990 [JP] Japan ................... 2-255133
Sep. 27, 1990 [JP] Japan ................... 2-255135
Oct. 4, 1990 [JP] Japan ................... 2-265123

[51] Int. Cl.$^6$ ................................... G01L 23/22
[52] U.S. Cl. ........................................... 73/35
[58] Field of Search ........................ 73/35; 123/425

[56] References Cited

U.S. PATENT DOCUMENTS

| 4,354,378 | 10/1982 | Oshiage et al. | 73/35 |
| 4,409,937 | 10/1983 | Asano . | |
| 4,420,967 | 12/1983 | Enoshima et al. . | |
| 4,478,068 | 10/1984 | Bonitz et al. . | |
| 4,528,955 | 7/1985 | Sugiura | 73/35 |
| 4,887,456 | 12/1989 | Cockerham et al. | 73/35 |

FOREIGN PATENT DOCUMENTS

3010324 4/1989 Germany .

*Primary Examiner*—John E. Chapman

*Attorney, Agent, or Firm*—Sughrue, Mion, Zinn, Macpeak & Seas

[57] ABSTRACT

A knock sensor detects the vibration of an internal combustion engine and the half wave of its output of the sensor is amplified by a half wave amplifier. From the amplified output, a vibration-signal producing circuit produces a vibration signal representative of the vibration of engine in synchronism with the crank angle. An arithmetic operation unit produces a reference signal. Then a comparator compares the reference signal with the vibration signal to output a knock signal indicative of the occurrence of knocking of the engine when the vibration signal exceeds the reference signal. A gain adjusting circuit may be provided between the knock sensor and the half wave amplifier for adjusting the input level to the half wave amplifier to set the output level of the amplifier to a proper level. The half wave amplifier may be provided with a gain selecting circuit which automatically changes the gain of half wave amplifier in accordance with the level of the knock sensor output. The gain selecting circuit increases the gain when the sensor output is lower than a predetermined level and decreases when the sensor output is higher than a predetermined level. An inverse transformation circuit may be provided after the half wave amplifier having the gain selecting circuit, so that the level of vibration signal is compressed when the gain of half wave amplifier is increased, and the level is expanded when the gain is decreased so as to reproduce a vibration signal proportional to the knock sensor output,

6 Claims, 11 Drawing Sheets

PRIOR ART

FIG.8

KNOCKING DETECTING APPARATUS FOR INTERNAL COMBUSTION ENGINE

This is a Continuation of application No. 07/765,291, filed Sep. 25, 1991, abandoned.

BACKGROUND OF THE INVENTION

1. Field of the Invention

The present invention relates to an apparatus for detecting knocking of an internal combustion engine such as a gasoline engine for automobiles, and more particularly to improving reliability in the detection of knocking.

2. Prior Art

Internal combustion engines such as those for automobiles have a plurality of cylinders. A mixture of gas must be burned at proper timings in the respective cylinders. Microcomputers are usually incorporated to control the ignition timings of respective igniters and the order of fuel injection through an injector into the respective cylinders so that the mixture of gas is properly burned.

Ignition timing set at too advanced crank angles can cause abnormal vibration of the engine called "knocking" with the result of damages to the cylinders. In which case, the control parameters of the cylinders must be controlled in such a direction so as to eliminate knocking (for example, ignition timing is retarded).

Figure 5A:
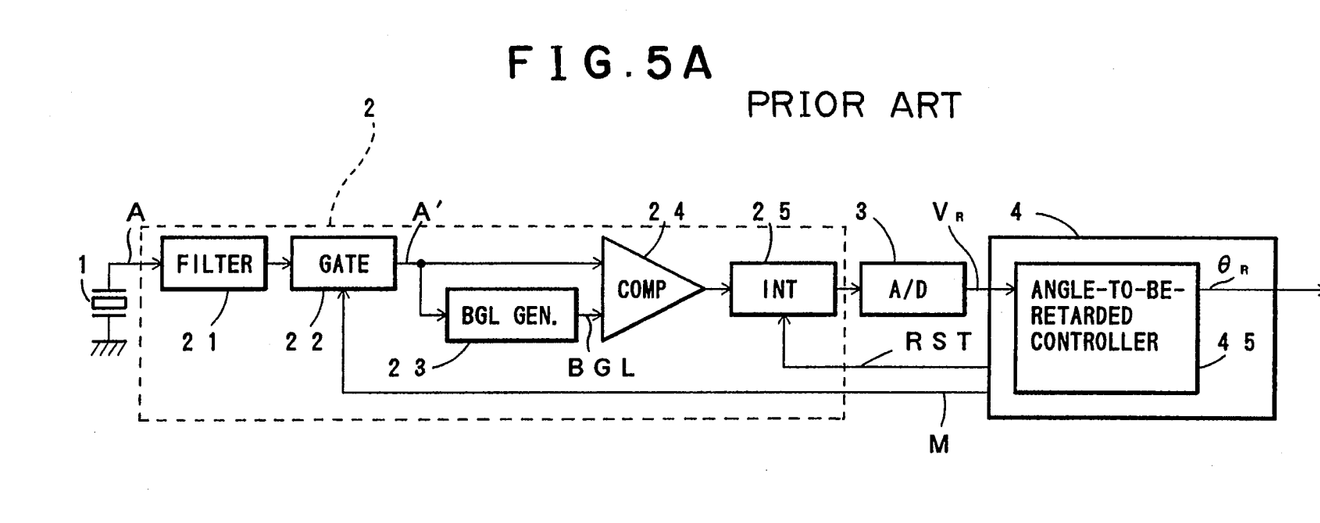
FIG. 5A is a block diagram showing a prior art knock detecting apparatus for internal combustion engines.
Figure 5B:
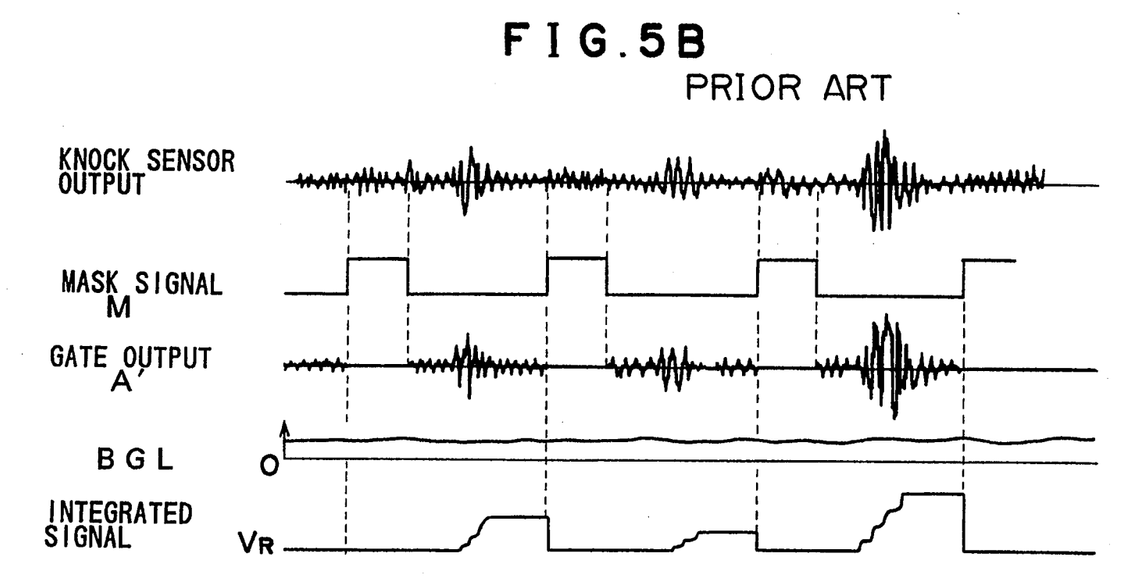
FIG. 5B is a waveform diagram illustrating the operation of the apparatus of FIG. 5A.

FIG. 5A shows a prior art knocking detecting apparatus for internal combustion engines and FIG. 5B is a waveform diagram illustrating the operation of the apparatus in FIG. 5A.

Conventionally, the respective cylinders are fired at crank angles more advanced than about B5 deg. before TDC(Top Dead Center) and the mixture of gas actually explodes at crank angles more retarded than 10-60 deg. after TDC(A10 - A60 deg.) Accordingly, knocking due to abnormal combustion of the mixture gas occurs at this explosion timing.

A knock sensor 1 takes the form of a piezoelectric element for detecting vibration and is mounted to one of the cylinders or to the respective cylinders. When knocking occurs, the output signal A of the knock sensor 1 shows a large periodic increase in amplitude as shown in FIG. 5B. A filter 21 in an interface circuit 2 passes frequency components specific to "knocking", i.e., six to eight kHz, and a gate 22 opens to output a signal A' while a mask signal M is at L level. A BGL generator 23 detects a background noise in an output signal A' from the output signal A' so as to produce a BGL(Background Noise Level) signal, which serves a reference signal to determine whether the knocking is actually occurring. The gate 22 is opened by the mask signal M supplied from a microcomputer 4 to pass the output of filter 21 to both a comparator 24 and a BGL generator 23. When the amplitude of the output signal A' exceeds the level of BGL signal, the comparator 24 determines that knocking has occurred, and outputs an H level. An integrator 25 starts to integrate an input thereto each time it is reset by a RST signal. An A/D converter 3 converts an analog signal outputted from the integrator 25 into a digital signal VR, and sends the digital signal to the microcomputer 4. The microcomputer 4 receives the digital signal each time the cylinders are fired so as to produce an angle-to-be-retarded $\theta R$ on the basis of the digital signal so that the firing timing is controlled in a direction so as to eliminate knocking. The microcomputer 4 outputs to the gate 22 the mask signal M that alternates between H and L levels at a predetermined period so that the interface circuit 2 efficiently receives the output signal A. For each cylinder, the mask signal goes high at a crank angle of about B75 deg. and goes low at about B5 deg. The gate 22 is closed by the H level of mask signal M. The RST signal is outputted by the microcomputer 4 to the integrator 25 at a predetermined period and rises at the same time as the RST signal.

An angle-to-be-retarded controller 45 in the microcomputer 4 adds an incremental value of angle-to-be-retarded $\Delta \theta R$ to the previous angle-to-be-retarded $\theta R^*$ so as to produce a new angle-to-be-retarded $\theta R$, $$\theta R = \theta R^* + \Delta \theta R \tag{1}$$

where $\Delta \theta R$ is given as follows:

$$\Delta \theta R = VR \text{ times } L$$

When the output signal A of knock sensor 1 is processed by the interface circuit 2, the higher the level of the output signal A the higher the accuracy of knocking control operation provided by the interface circuit 2. For highest accuracy, a "full wave" amplifier (i.e., class A amplifier) is provided between the knock sensor 1 and the interface circuit 2 so as to amplify the sensor output signal A before supplying it to the interface circuit 2.

Figure 6:
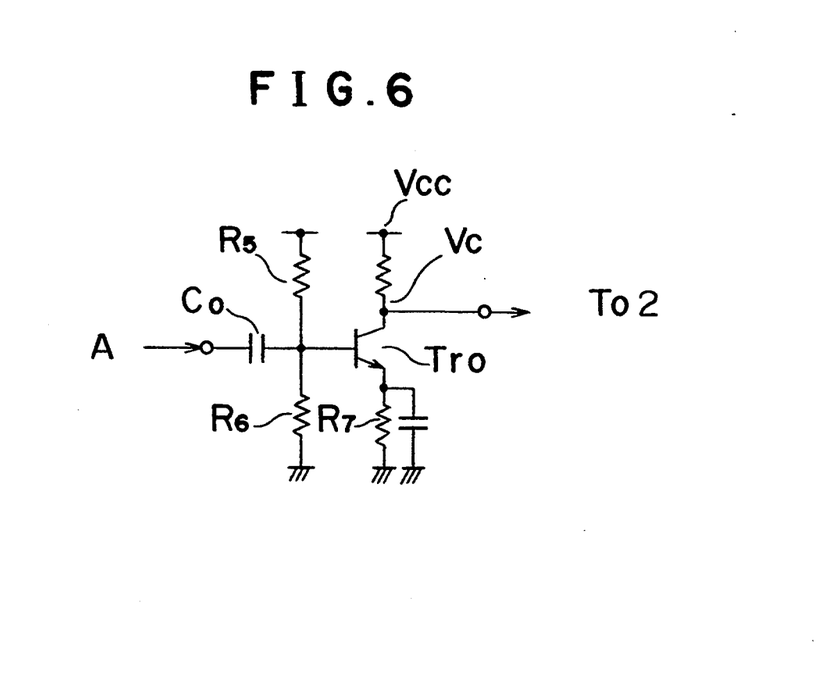
FIG. 6 shows a full wave amplifier-used in a conventional knocking detecting apparatus of FIG. 5A.
Figure 7:
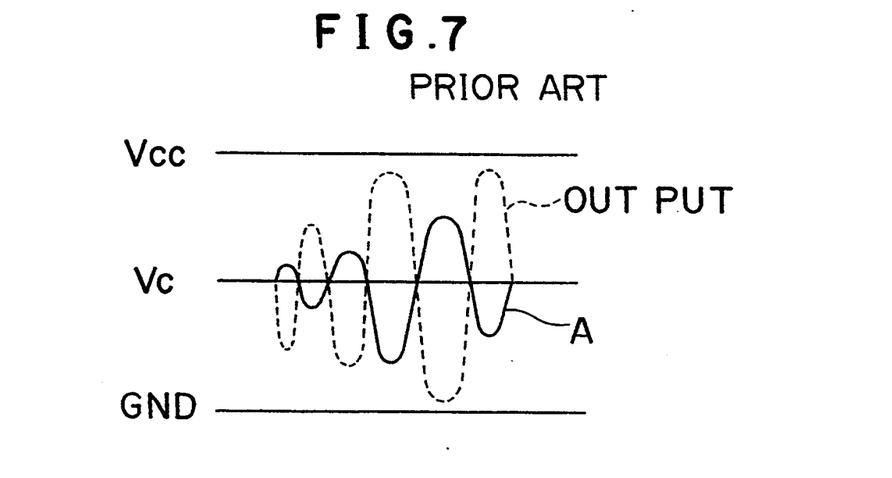
FIG. 7 shows the output waveform of the amplifier of FIG. 6.

FIG. 6 shows an emitter-grounded type class A amplifier. Biasing resistors R5 and R6 provide a base biasing voltage for the base of an amplifying transistor. Tro. A resistor R7 is an emitter-biasing resistor. The signal A is supplied to the amplifier via a coupling capacitor Co which blocks a d-c component of the signal A. The amplified output is supplied to the interface circuit 2.

The collector voltage Vc of the transistor Tro is set to about ½ of the power supply voltage Vcc so that the amplitude of amplified signal A varies about the collector voltage Vc between Vcc and near GND level. However, the amplified signal A is saturated beyond the maximum output swing to cause distortion of signal waveform.

It should be noted that the comparator 24 compares the BGL signal with the level of the half wave of the amplified signal A, That is, only half the amplified waveform is used to determine whether knocking is occurring, Therefore, the dynamic range of the amplifier may not be sufficient.

Figure 8:
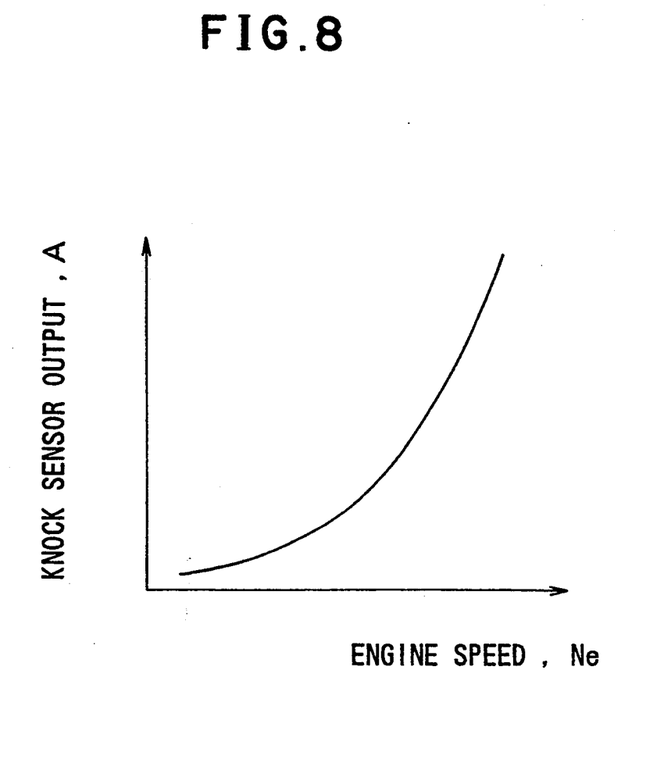
FIG. 8 shows the relationship between the engine speed Ne and the sensor output signal A.

The level of knock sensor output A depends not only on the degree of knocking but also on the operating conditions of an engine. FIG. 8 shows the relationship between engine speed Ne and sensor output signal A. The level of signal A increases with increasing engine speed Ne, so that accurate and reliable detection of knocking is seriously affected if the characteristics of interface circuit 2 changes and errors are developed in the A/D converter 3.

SUMMARY OF THE INVENTION

An object of the invention is to provide a knocking detecting apparatus for internal combustion engines where a greater dynamic range of an amplifier for amplifying the output signal of a knock sensor is provided so that the accuracy of detecting knocking is not impaired even if the output level of knock sensor varies due to varying operating conditions of an engine or variations in the sensitivity of the sensor.

A knock sensor detects the vibration of an internal combustion engine and the half wave of output of the sensor is amplified by a half wave amplifier. From the amplified output, a vibration-signal producing circuit, produces a vibration signal representative of the vibration of engine in synchronism with the crank angle. An arithmetic operation unit produces a reference signal and then a comparator compares the reference signal with the vibration signal to output a knock signal indicative of the occurrence of knocking when the vibration signal exceeds the reference signal.

A gain adjusting circuit may be provided between the knock sensor and the half wave amplifier so as to adjust the input level to the half wave amplifier to set the output level of the amplifier to a proper level.

The half wave amplifier may be provided with a gain selecting circuit which automatically changes the gain of half wave amplifier in accordance with the level of the knock sensor output. The gain selecting circuit increases the gain when the sensor output is lower than a predetermined level, and decreases when the sensor output is higher than a predetermined level. A compander (inverse transformer) may be provided after the half wave amplifier having the gain selecting circuit, so that the level of vibration signal is compressed when the gain of half wave amplifier is increased, and the level is expanded when the gain is decreased so as to reproduce a vibration signal proportional to the knock sensor output.

BRIEF DESCRIPTION OF DRAWINGS

Features and other objects of the invention will be more apparent from the description of the preferred embodiments with reference to the accompanying drawings in which:

FIG, 2C shows an interface circuit 20 and a microcomputer 40 as a third embodiment;

FIG. 48 shows the inverse transformation characteristics of an inverse transformer 41;

DETAILED DESCRIPTION OF THE PREFERRED EMBODIMENT

First Embodiment

Figure 1A:
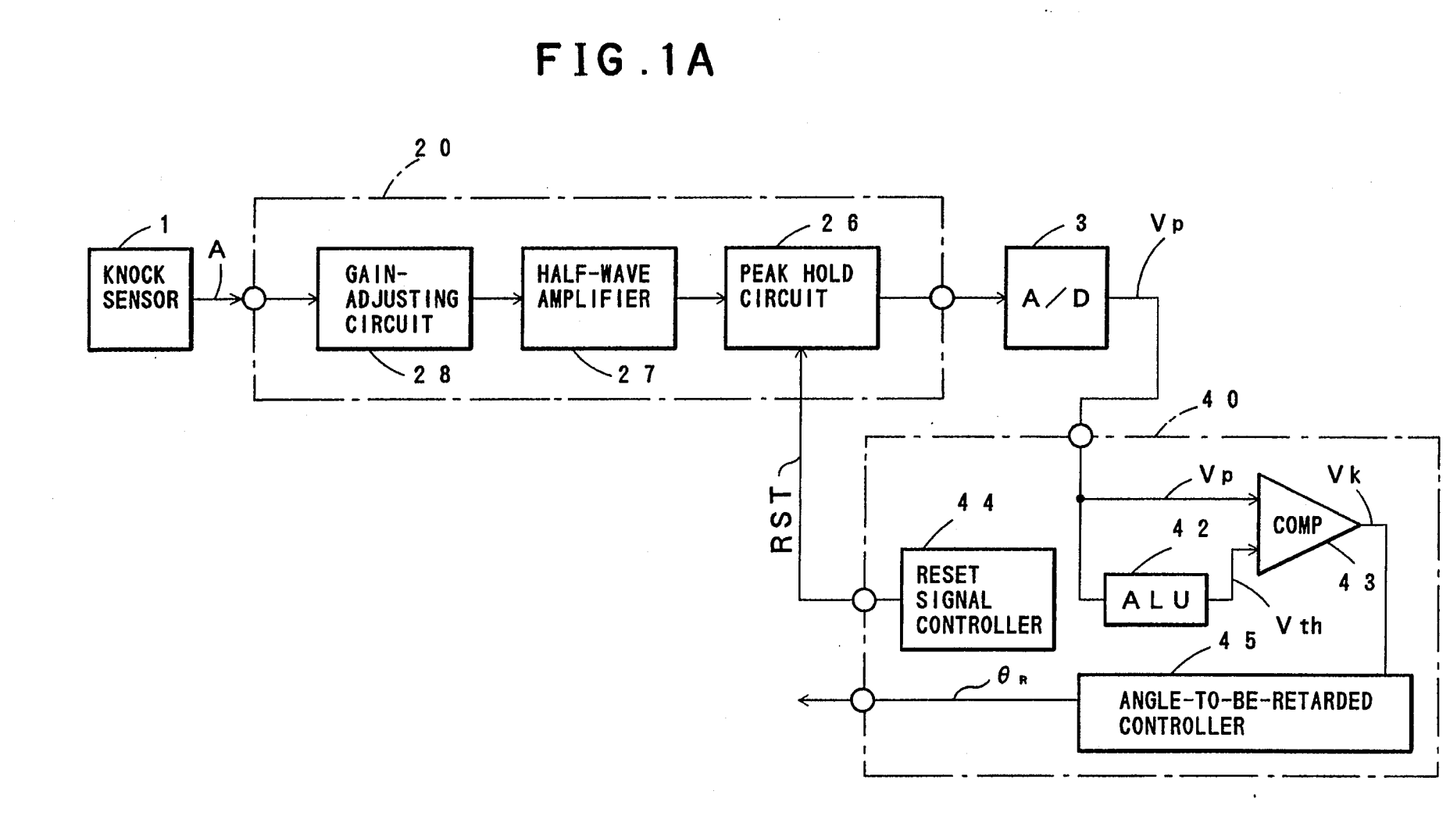
FIG. 1A is a block diagram showing a first embodiment of the present invention.
Figure 1B:
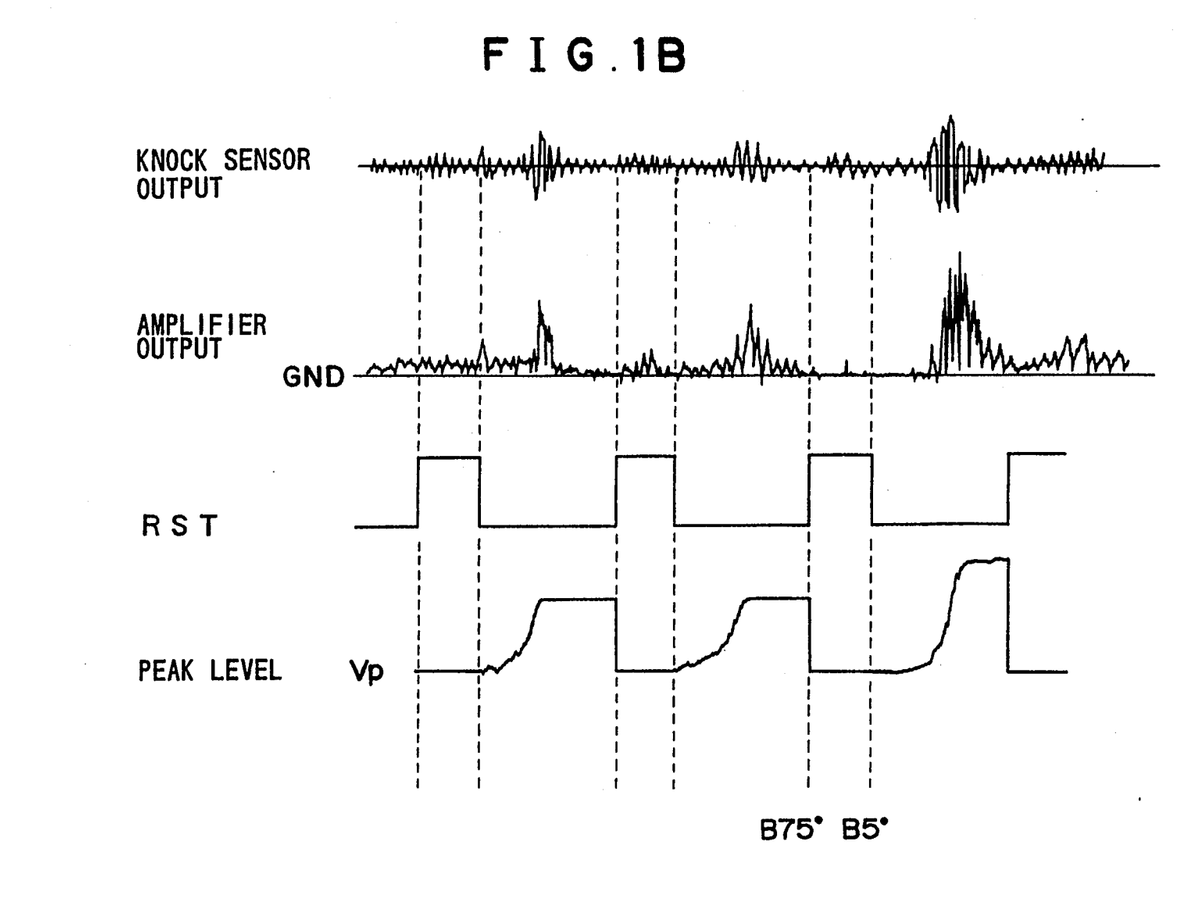
FIG. 1B is a waveform diagram illustrating the operation of the first embodiment of FIG. 1.

FIG. 1A is a block diagram showing a first embodiment of the present invention. A knock sensor 1 and an A/D converter 3 are the same as those shown in FIG. 5A. An interface circuit 20 includes a gain adjusting circuit. 28, a half wave amplifier 27, and a peak hold circuit 26. The gain adjusting circuit 28 receives the output signal A from the knock sensor 1 each time the cylinders are fired, and attenuates the signal level to a desired level. The output of a half wave amplifier 27 is supplied to the peak hold circuit 26 where a peak level of the output of half wave amplifier 27 is detected, The A/D converter 3 converts the output of peak hold circuit 26 into a digital signal Vp, which in turn is supplied to the microcomputer 40. The microcomputer 40 has an arithmetic operation unit(ALU) 42, A comparator 43, an angle-to-be-retarded controller 45, and a reset signal controller 44. The arithmetic operation unit 42 averages the peak level Vp to produce a threshold signal Vth used for detecting knocking. It should be noted that the peal level Vp is produced from the knock sensor output which contains the knocking noise superimposed to background noise. Therefore, the peal level Vp also contains information about the background noise. In this manner, averaging the peak level Vp provides the threshold signal Vth substantially indicative of the background noise. The comparator 43 outputs a knock signal Vk then the signal Vp exceeds the threshold Vth. The angle-to-be-retarded controller 45 produces an angle-to-be-retarded $\theta R$ on the basis of the knock signal Vk so that the crank angle at which the cylinder is fired is retarded in accordance with $\theta R$. The reset signal controller 44 outputs a reset signal RST in synchronism with the crank angles of the respective cylinders. The reset signal RST corresponds to, for example, the mask signal M shown in FIG. 5B, which rises at a first; crank angle B75 deg. of the respective cylinder and falls at a second crank angle B5 deg(after ignition timing.) That is, the peak hold circuit 26 detects the peak level of vibration of the cylinder at a crank angle of B75 deg, and supplies the peak level as Vp to the microcomputer 40 via the A/D converter 3.

Figure 2A:
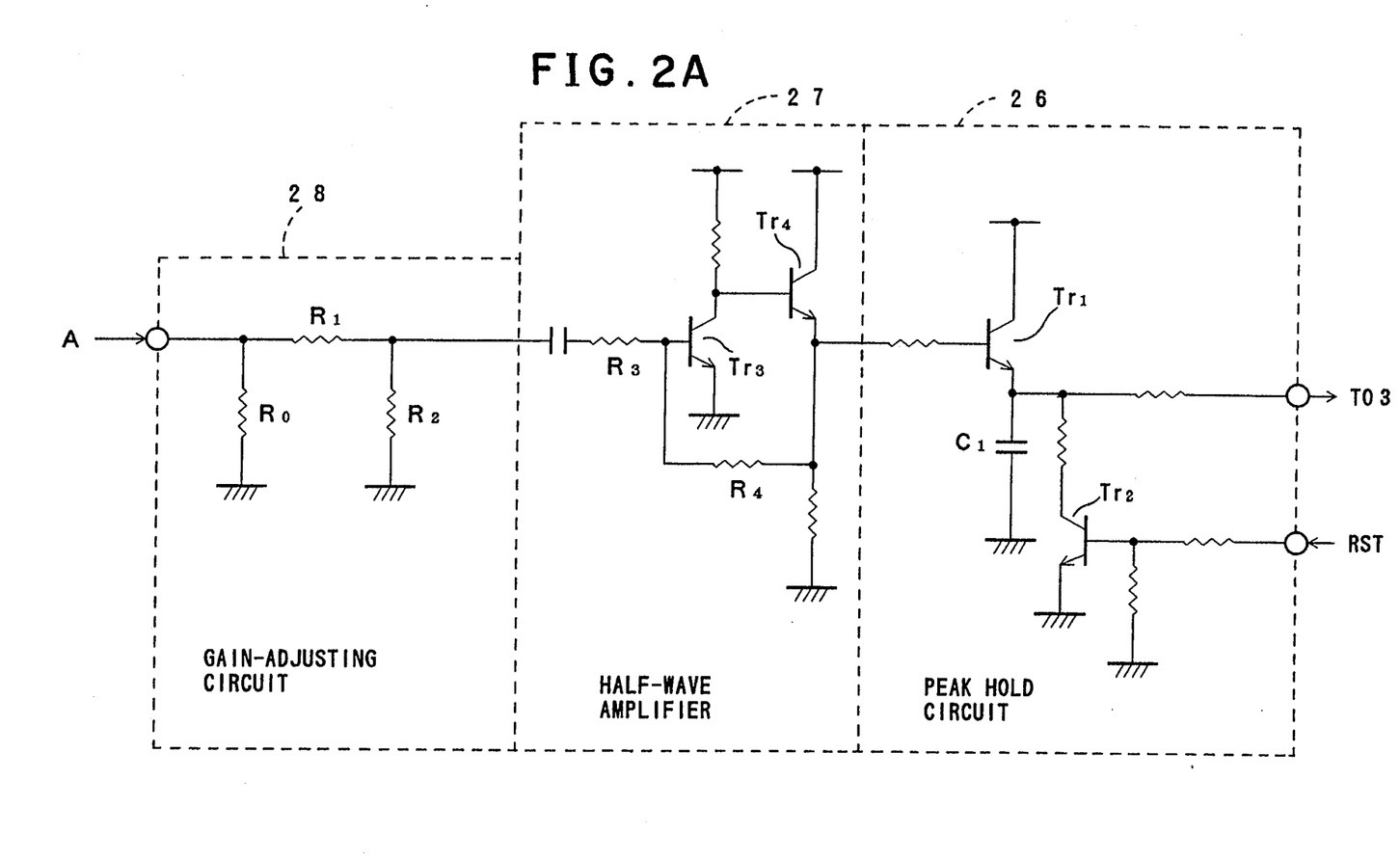
FIG. 2A shows an interface circuit of the first embodiment.

FIG. 2A shows a specific embodiment of an interface circuit 20. A resistor Ro is a matching resistor connected in parallel with the knock sensor 1. Resistors R1 and R2 divide the output signal A of knock sensor 1 by a desired ratio and the voltage across R2 is supplied to the half wave amplifier 27. The half wave amplifier 27 is a two-stage type direct coupled negative feedback amplifier where the base bias of a transistor Tr3 is supplied via a resistor R4 from the emitter of a transistor Tr4 and the amplified signal is fed back through the resistor R4. The gain of amplifier 27 is given by R3/R4. It should be noted that the transistor Tr3 has no emitter-biasing resistor between the emitter of the Tr3 and the ground. By this arrangement, the dynamic range of half wave amplifier is increased since only a half cycle of the input is allowed to swing in full range of the linear region of the amplifier.

The output of half wave amplifier 27 drives the transistor Tr1 in the peak hold circuit 26 so that the holding capacitor C1 holds the peak level of output of amplifier 27. The voltage across the holding capacitor-C1 is supplied to the A/D converter 3 via a buffer resistor. The H level of reset signal RST from the reset signal controller 44 turns the transistor Tr2 on to reset the charge stored across the capacitor-C1.

The operation of the knocking detecting apparatus for internal combustion engines in FIGS. 1A and 2A will now be described below.

The voltage dividing resistors R1 and R2 are properly set taking into account, various vehicle models and the sensitivity of knock sensors, so that the output of half wave amplifier 27 is a reasonable desirable level. When no signal is fed into the half wave amplifier 27, the emitter biasing voltage of Tr4 is nearly equal to the base voltage of Tr3, The emitter biasing voltage of Tr4 remains substantially the same irrespective of the value of R4. The knock sensor 1 detects the vibration of cylinders of the engine to output a signal A indicative of the magnitude of vibration. Only the half wave of signal A is amplified and is then supplied to the peak hold circuit 26 where the peak level of the amplified signal is held. The A/D converter 3 converts the output of peak hold circuit 26 at a crank angle of B75 deg. into a digital signal and supplies it as the vibration level Vp to the microcomputer 40. At this time, the peak hold circuit 26 holds the amplified peak level. The comparator 43 compares the vibration level Vp with the threshold Vth to output a knock signal Vk, if Vp is greater than Vth, to the angle-to-be-retarded controller 45. The reset signal controller 44 outputs an H level of reset signal RST so as to reset the peak hold circuit 26 at a crank angle slightly past the reference B75.

The peak hold circuit 26 remains reset during H level of reset signal RST and resumes its operation when the RST goes to L level.

The output signal A of knock sensor 1 varies from cycle to cycle of an engine, and therefore the vibration level Vp obtained at every crank angle of B75 deg. also varies from cycle to cycle. Since the peak hold circuit 26 remains reset at more advanced angles than a predetermined crank angle, there is no possibility that the sensor output contains not only noise due to knocking but also valve noise and electromagnetic noise when the cylinders are fired.

The output signal of knock sensor 1 includes noises other than noise resulted from knocking. Since the vibration level varies from cycle to cycle of an engine, the threshold should loosely follow the vibration level Vp so that knocking is detected more reliably. Conversely, if the threshold follows the change of vibration level Vp too closely, then the threshold fails to reasonably indicate a background noise level (BGL signal); accurate knocking detection is not effected. Thus, the arithmetic operation unit 42 averages out the vibration level Vp, amplifies the averaged Vp, and then adds an offset to the averaged Vp so as to produce an ultimate threshold Vth which in turn supplied to the comparator 43.

The comparator compares the vibration level Vp with the threshold level Vth to output the knock signal Vk indicative of the occurrence of knocking if the vibration level Vp exceeds the threshold level Vth. If the knock signal Vk is outputted, then the angle-to-be-retarded controller 45 calculates an incremental value of angle-to-be-retarded $\Delta\theta R$ and then $\theta R$ according to equation (1). The crank angle at which the cylinder is fired is retarded in accordance with angle-to-be-retarded $\theta R$; thus knocking is prevented. If the knock signal Vk is not, outputted, then the angle-to-be-retarded $\theta R$ remains the same as the previous value.

Figure 3:
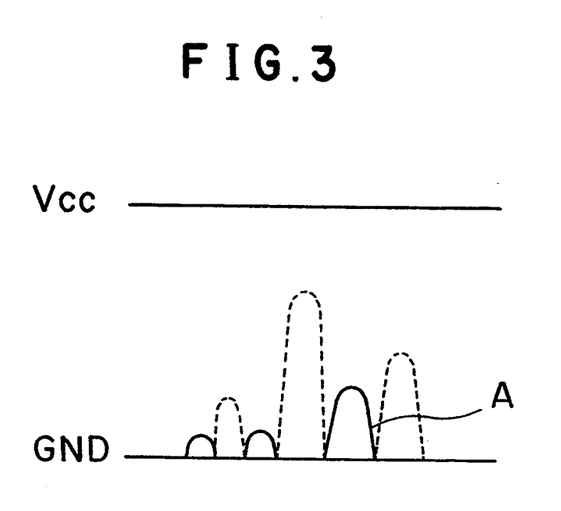
FIG. 3 is a waveform diagram illustrating the operation of a half wave amplifier of the first embodiment.

At this time, the half wave amplifier 27 amplifies only a half wave of sensor output. A with respect to the ground such that the amplified half wave swings somewhere between GND and Vcc as shown in FIG 3. The maximum output of the amplifier swings between GND and Vcc without saturation. Thus, the dynamic range of the signal processed in the interface circuit 20 is increased with the result that the noise due to knocking is accurately detected.

The proper selection of values of respective elements in the gain adjusting circuit 28, provides a reasonable signal level at the output of amplifier 27. This is advantageous in overcoming the variations of vibration signal Vp encountered when the knocking detecting apparatus is used for different engines or different types of knock sensors used, Thus, the knock detection is effected with high reliability and accuracy.

The above embodiment has been described with respect to the vibration signal Vp supplied from the peak hold circuit 26, the peak hold circuit 26 may be replaced by an integrator. In the embodiment, while knocking is controlled by retarding the ignition timings(crank angles) at which the respective cylinders are fired, other parameters such as air-to-fuel ratio and boost pressure may be controlled in a direction so as to eliminate knocking.

Second Embodiment

Figure 2B:
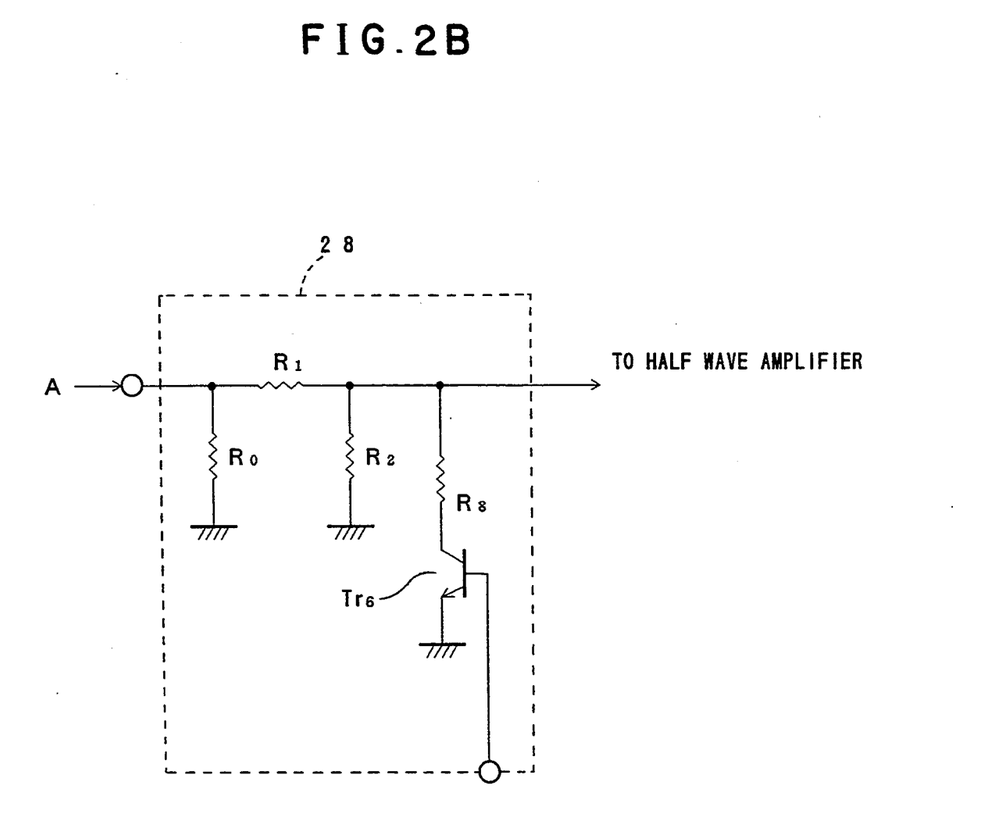
FIG. 2B shows a second embodiment of a gain adjusting circuit.

FIG. 2B shows a second embodiment where a series circuit of a resistor R8 and a transistor Tr6 is inserted into the gain adjusting circuit 28 of the first embodiment.

The output of knock sensor 1 varies depending on the models of engines and the operating conditions of the engines. To compensate for the variations of knock sensor output, the resistor R8 is effectively inserted into or deleted from the circuit by turning on or off the transistor Tr6. This eliminates the need for changing the values of resistors R1 and R2 for each model of engine.

Third Embodiment

Figure 2C:
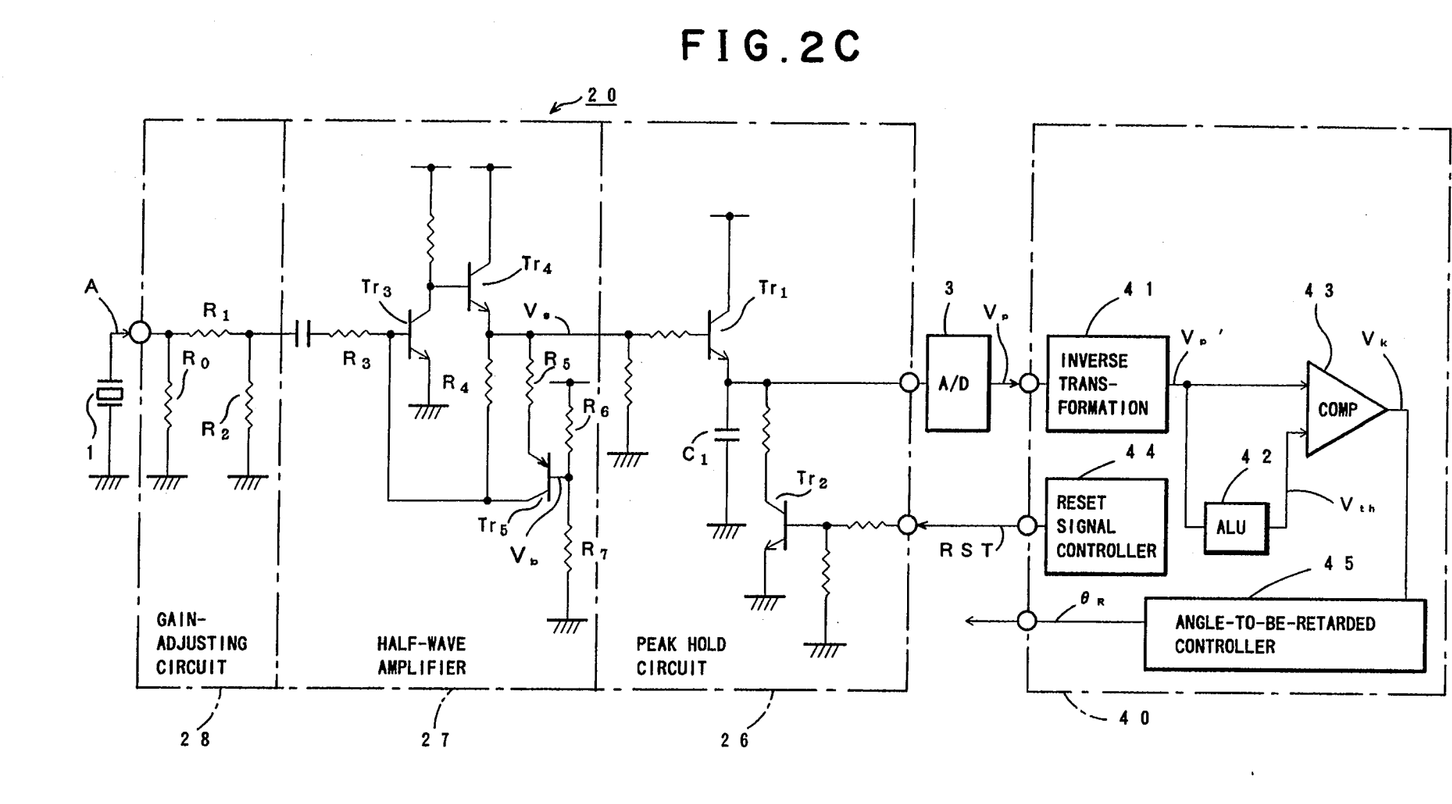

FIG. 2C shows a third embodiment of the interface circuit 20 and microcomputer 40. The half wave amplifier 27 is a two-stage type direct coupled negative feedback amplifier where the base bias of a transistor Tr3 is supplied via a resistor R4 from the emitter of a transistor Tr4 and the output of the amplifier is fed back through the resistor R4. It should be noted that the transistor Tr3 has no emitter-biasing resistor between the emitter of Tr3 and the ground.

A series circuit of a resistor R5 and a transistor Tr5 is inserted in parallel with the resistor R4. The transistor Tr5 is biased to Vb by resistors R6 and R7. When the output Vg of half wave amplifier exceeds Vb, the Tr5 becomes on so that a resistor R5 is inserted in parallel with R4. When the output Vg of half wave amplifier decreases below Vb, the Tr5 turns off so that a resistor R5 is out of the circuit. The gain adjusting circuit 28 and the peak hold circuit 26 are the same as those in the first embodiment.

The microcomputer 40 has an inverse transformation circuit 41, a comparator 43, an angle-to-be-retarded controller 45, and a reset signal controller 44. The gain of half wave amplifier 27 changes depending on the magnitude of Vg and therefore the output Vp of the A/D converter is not proportional to the sensor output A. The inverse transformation circuit transforms the vibration level Vp back into a signal. Vp' which is proportional to the output of knock sensor 1. The arithmetic unit 42 averages out the peak level Vp' to produce a threshold signal Vth. The comparator 43 outputs a knock signal Vk when the inversely transformed vibration level Vp' exceeds the threshold Vth. The angle-to-be-retarded controller 45 produces an-angle-to-be-retarded $\theta R$ by which the ignition timing is retarded.

The reset signal controller 44 outputs a reset signal RST to the peak hold circuit 26 in accordance with crank angles at which igntions are effected for the respective cylinders. The reset signal RST is produced just as in the first embodiment, that is, the signal RST rises at a first crank angle B75 deg. of the respective cylinder and falls at a second crank angle B5 deg(after ignition timing,) That is, the peak hold circuit 26 detects the peak level of vibration of the cylinder at a crank angle of B75 deg. and supplies the peak level as Vp to the microcomputer 40 via the A/D converter 3.

Figure 4A:
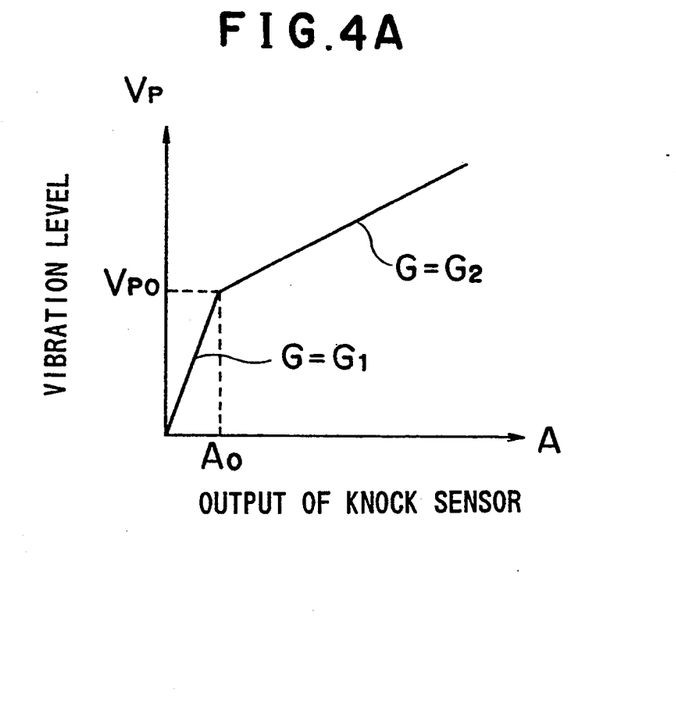
FIG. 4A shows amplifying characteristics of a half wave amplifier 27.
Figure 4B:
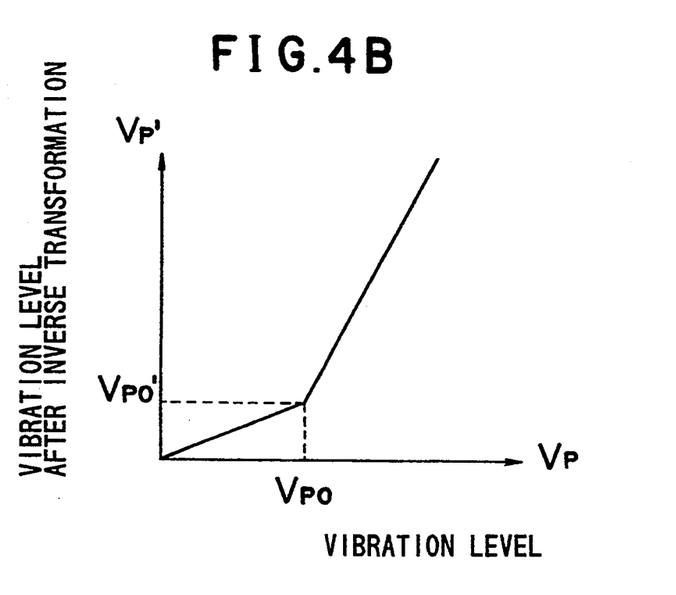

FIG. 4A shows the amplification characteristics of the half-wave amplifier 27. Ao and Vpo are the values for the amplifier output and the vibration level Vp when the gain G of the half wave amplifier is switched from G1 to G2(G1>G2). FIG. 4B shows inverse transformation characteristics of the inverse transformation circuit 41 where Vpo' is an inversely transformed vibration level corresponding to Vpo.

The operation of the third embodiment will now be described with reference to FIG. 2C and FIGS. 4A and 4B.

By properly setting the values of resistors R1 and R2 of gain adjusting circuit 28, the variation of level of the output signal A due to different models and sensor variations etc. is compensated for. When no signal is fed into the half wave amplifier 27, the emitter biasing voltage of Tr4 is nearly equal to the base voltage of Tr3. The emitter biasing voltage of Tr4 remains substantially the same irrespective of the value of R4. When the output Vg of half wave amplifier is below the base biasing voltage Vb, i.e., when $Vg \leq Vb$, the transistor Tr5 goes off so that only the feedback resistor R4 comes into the circuit. Thus, the gain G of half wave amplifier 27 is a large value and is given by $$G = R4/R3 = G1$$

Meanwhile, when Vg is higher than Vb, i.e. , $Vg > Vb$, the transistor Tr5 is turned on so that the resistor R5 is in parallel with the resistor R4. Thus, the gain of half wave amplifier is small and is given by $$G = R45/R3 = G2 < G1$$

where R45 is a parallel resultant resistance of R4 and R5.

When $Vg \geq Vb$, $Vp = (R4/R3)a$ where a is the magnitude of the signal A.

When $Vg > Vb$, $Vp = (R45/R3)a + (1-R45/R4)Vb$.

The vibration level Vp based on the non-linearly amplified signal A is converted into a digital signal each time the cylinders are fired, and is supplied to the microcomputer 40. The inverse transformation circuit 41 transforms the vibration level Vp back into Vp' as shown in FIG. 4B in order to provide a vibration level proportional to the sensor output signal A. That is, the vibration level Vp is compressed when G=G1, and is expanded when G=G2, thereby producing the vibration level Vp' proportional to the actual sensor output signal A.

Thus when $Vg \leq Vb$, i.e., $G = R4/R3 = G1$, the vibration level Vp' after inverse transformation is given as follows:

$$Vp' = (R3/R4)Vp$$

When $Vg \geq Vb$, i.e., $G = R45/R3 = G2$, the vibration level Vp' after inverse transformation is given as follows:

$$Vp' = (R3/R45)(Vp - Vb) + (R3/R4)Vb$$

In this manner, the vibration level Vp' after inverse transformation becomes proportional to the output of knock sensor 1.

The arithmetic operation unit 42 produces a threshold level Vth that loosely reflects various changes contained in the vibration level Vp' after inverse transformation. In other words, the arithmetic operation unit 42 averages out the vibration level Vp', amplifies the vibration level Vp', and then adds offset to the amplified Vp' so as to provide an ultimate threshold Vth.

The comparator 43 compares the vibration level Vp' with the threshold Vth to output a knock signal Vk when the vibration level Vp' exceeds the threshold Vth. In accordance with the knock signal Vk, the angle-to-be-retarded controller 45 calculates an incremental value of angle-to-be-retarded $\Delta \theta R$ required to control knocking and then calculates an amount of $\theta R$ so as to retard the crank angle at which firing is effected.

If a longer processing time of arithmetic operation unit 42 is not a problem, the inverse transformation circuit 41 may be omitted and a similar inverse transformation function may be provided in the arithmetic operation unit 42.

This arrangement allows the compensation of the magnitude of knock sensor 1 varying in accordance with the operating conditions of the engine, so that knocking is properly detected.

What is claimed is:

1. A knocking detecting apparatus for use in an internal combustion engine, comprising:
    means for detecting a vibration of the internal combustion engine to output a first signal;
    half-wave amplifying means for amplifying only a half wave of said first signal and outputting an amplified half wave of said first signal;
    a gain adjusting means between said detecting means and said half wave amplifying means, said gain adjusting means adjusting an input level of said first signal to said half wave amplifying means so as to adjust an output of said half wave amplifying means to a desired level, thereby preventing the half wave of the first signal from becoming saturated;
    vibration signal producing means for producing a second signal indicative of a magnitude of vibration of the internal combustion engine at predetermined periods in accordance with the amplified half wave of said first signal;
    reference signal producing means for producing a reference signal used for determining whether knocking of the internal combustion engine is actually occurring;
    comparing means for comparing said second signal with said reference signal to output a knock signal indicative of an occurrence of knocking of the engine when said second signal exceeds said reference signal; and
    gain selecting means for automatically changing a gain of said half wave amplifying mean in accordance with an instantaneous amplitude of said output of said half wave amplifying means, said gain being increased when said output of said half wave amplifying means is below a predetermined value and is decreased when said output of said half wave amplifying means is above a predetermined value.

2. A knocking detecting apparatus according to claim 1, wherein said apparatus further includes inverse transformation means, said inverse transformation means generating a modified second signal by compressing said magnitude of said second signal when said gain is increased, and expanding said magnitude of said second signal when said gain is decreased, wherein said modified second signal is proportional to said first signal.

3. A knocking detecting apparatus according to claim 1, wherein said half-wave amplifying means comprises a bipolar transistor whose emitter is directly coupled to ground, thereby preventing the half-wave of said first signal to become saturated.

4. A knocking detecting apparatus for use in an internal combustion engine, comprising:
   means for detecting a vibration of the internal combustion engine to output a first signal;
   half wave amplifying means for amplifying only a half wave of said first signal and outputting an amplified half wave of said first signal;
   a gain adjusting means between said detecting means and said half wave amplifying means, said gain adjusting means adjusting an input level of said first signal to said half wave amplifying means so as to adjust an output of said half wave amplifying means to a desired level, thereby preventing the half wave of the first signal from becoming saturated;
   vibration signal producing means for producing a second signal indicative of a magnitude of vibration of the internal combustion engine at predetermined periods in accordance with the amplified half wave of said first signal;
   reference signal producing means for producing a reference signal used for determining whether knocking of the internal combustion engine is actually occurring, said reference signal producing means producing said reference signal on the basis of said second signal by arithmetically averaging the peak level of said second signal over several ignition cycles of said engine;
   comparing means for comparing said second signal with said reference signal to output a knock signal indicative of an occurrence of knocking of the engine when said second signal exceeds said reference signal, and
   a gain selecting circuit for automatically changing a gain of said half wave amplifying means in accordance with an instantaneous amplitude of said output of said half wave amplifying means, said gain being increased when said output of said half wave amplifying means is below a predetermined value and is decreased when said output of said half wave amplifying means is above a predetermined value.

5. A knocking detecting apparatus according to claim 4, wherein said apparatus further includes inverse transformation means, said inverse transformation means generating a modified second signal by compressing said magnitude of said second signal when said gain is increased, and expanding said magnitude of said second signal when said gain is decreased, wherein said modified second signal is proportional to said first signal.

6. A knocking detecting apparatus for use in an internal combustion engine, comprising:
   means for detecting a vibration of the internal combustion engine to output a first signal;
   half wave amplifying means for amplifying only a half wave of said first signal and outputting an amplified half wave of said first signal;
   a gain adjusting means between said detecting means and said half wave amplifying means, said gain adjusting means adjusting an input level of said first signal to said half wave amplifying means so as to adjust an output of said half wave amplifying means to a desired level, thereby preventing the half wave of the first signal from becoming saturated;
   vibration signal producing means for producing a second signal indicative of a magnitude of vibration of the internal combustion engine at predetermined periods in accordance with the amplified half wave of said first signal;
   reference signal producing means for producing a reference signal used for determining whether knocking of the internal combustion engine is actually occurring, said reference signal producing means producing said reference signal on the basis of said second signal by arithmetically averaging the peak level of said second signal over several ignition cycles of said engine;
   comparing means for comparing said second signal with said reference signal to output a knock signal indicative of an occurrence of knocking of the engine when said second signal exceeds said reference signal,
   wherein said half-wave amplifying means comprises a bi-polar transistor whose emitter is directly coupled to ground, thereby preventing the half-wave of said first signal to become saturated.

* * * * *